US005329627A

United States Patent [19]
Nanda et al.

[11] Patent Number: 5,329,627
[45] Date of Patent: Jul. 12, 1994

[54] METHOD AND APPARATUS FOR A TRANSLATION LOOKASIDE BUFFER WITH BUILT-IN REPLACEMENT SCHEME IN A COMPUTER SYSTEM

[75] Inventors: Sunil Nanda, Los Altos; Norman M. Hayes, Sunnyvale, both of Calif.

[73] Assignee: Sun Microsystems, Inc., Mountain View, Calif.

[21] Appl. No.: 870,356

[22] Filed: Apr. 17, 1992

[51] Int. Cl.$^5$ .............................................. G06F 12/12
[52] U.S. Cl. .................................. 395/400; 395/425; 364/243.4; 364/253.1; 364/246.1; 364/DIG. 1
[58] Field of Search ................................ 395/400, 425

[56] References Cited

U.S. PATENT DOCUMENTS

| | | | |
|---|---|---|---|
| 4,195,343 | 3/1980 | Joyce | 395/425 |
| 4,731,739 | 3/1988 | Woffinden et al. | 395/400 X |
| 4,783,735 | 11/1988 | Miu et al. | 395/425 |
| 4,802,086 | 1/1989 | Gay et al. | 395/425 |
| 4,928,239 | 5/1990 | Baum et al. | 395/425 |
| 4,961,135 | 10/1990 | Uchihori | 395/400 |
| 4,996,641 | 2/1991 | Talgam et al. | 395/425 |
| 5,155,825 | 10/1992 | Moughanni et al. | 395/425 |

Primary Examiner—Joseph L. Dixon
Assistant Examiner—Michael A. Whitfield
Attorney, Agent, or Firm—Blakely Sokoloff Taylor & Zafman

[57] ABSTRACT

A method and apparatus for selecting an entry to be replaced in a translation lookaside buffer in a computer system. The translation lookaside buffer stores a plurality of entries of virtual-to-physical address translations with each entry having a used bit and a valid bit. The circuit comprises a validity circuit coupled to the valid bit of each entry for determining whether the entry is valid and if not, the validity circuit causes a first signal to be asserted; a use circuit coupled to the used bit of each entry and to the validity circuit for determining whether the entry is used when a control signal is present and if not, the use circuit asserts a second signal to the validity circuit, the asserted second signal causing the first signal to be asserted; a ripple circuit coupled to each entry, its previous entry and its next entry, the ripple circuit receiving the first signal from the validity circuit of each entry and a first FOUND signal from its previous entry, the ripple circuit outputting a second FOUND signal, the ripple circuit causing the second FOUND signal to be asserted when the first signal is asserted and the first FOUND signal is de-asserted, the ripple circuit causing the second FOUND signal to be asserted when the first FOUND signal is asserted, the second FOUND signal being input to the ripple circuit of its next entry, wherein an asserted second FOUND signal for an entry causes the second FOUND signal for its next entry to be asserted, such that an entry with an asserted second FOUND signal propagates the asserted second FOUND signal through its next consecutive entries.

12 Claims, 3 Drawing Sheets

METHOD AND APPARATUS FOR A TRANSLATION LOOKASIDE BUFFER WITH BUILT-IN REPLACEMENT SCHEME IN A COMPUTER SYSTEM

BACKGROUND OF THE INVENTION

1. Field of the Invention

The present invention relates to cache memories in a computer system and more specifically to the transition lookaside buffers of the cache memories in such a computer system.

2. Art Background

In a computer system it is quite common for a central processing unit ("CPU") to have a cache memory to speed up memory access operations to main memory of the computer system. The cache memory is smaller, but much faster than main memory. It is placed operationally between the CPU and main memory. During the execution of a software program, the cache memory stores the most frequently utilized instructions and data. Whenever the processor needs to access information from main memory, the processor examines the cache first before accessing main memory. A cache miss occurs if the processor cannot find instructions or data in the cache memory and is required to access the slower main memory. Thus, the cache memory reduces the average memory access time of the CPU. For further information on cache memories, please refer to *Computer Architecture: A Quantitative Approach*, by John L. Hennessy and David A. Patterson, (Morgan, Kaufman Publishers, Inc., 1990).

In present day computing technology it is common to have a process executing only in main memory ("physical memory") while a programmer or user perceives a much larger memory which is allocated on an external disk ("virtual memory"). Virtual memory allows for very effective multi-programming and relieves the user of the unnecessarily tight constraint of main memory. To address the virtual memory, many processors contain a translator to translate virtual addresses in virtual memory to physical addresses in physical memory, and a translation lookaside buffer ("TLB"), which caches recently generated virtual-physical address pairs. The TLBs are essential because they allow faster access to main memory by skipping the mapping process when the translation pairs already exist. A TLB entry is like a cache entry where a tag holds portions of the virtual address and a data portion typically holds a physical page frame number, protection field, used bit and dirty bit.

Referring to FIG. 1, the operation of a cache begins with the arrival of a virtual address 100 and the appropriate control signals. The virtual address 100 is passed to both the TLB 110 and cache memory 120. The TLB 110 accepts a virtual page number 101 and uses it to select a set of elements, which is then searched associatively for a match of the virtual address 100. If a match is found, the corresponding physical address 121 is passed to the comparator to determine whether the data is in the cache 120.

If the TLB 110 does not contain the virtual-physical address pair needed for translation, an address translator is invoked. The address translator typically uses the high order bits of the virtual address 100 as an entry into the segment and page tables 105, which may be in either the cache or main memory, for the process and bit and then returns the address pair to the TLB 110, thus replacing an existing TLB entry.

Attached to each entry in the TLB, a valid bit indicates whether the entry is valid to ensure that the corresponding physical page has not been modified. Also, a use bit is set when an entry in the TLB is used to supply the mapping for virtual-physical addresses. When a new entry is stored in the TLB, the used bit is initially reset. During a TLB compare function, if the valid bit is reset, no compare takes place for that entry. If the valid bit is set, then a compare function can proceed. If the compare results a match, the use bit is set to indicate the virtual-physical mapping is used. TLBs are typically content-addressable memories ("CAM") and thus are usually four times as large as their random access memory ("RAM") counterpart. This is due to the built-in associative logic in the transistors, which operates a "compare" function in addition to a "hold" function.

When an entry is not found in the TLB, the TLB will be updated by replacing an entry with a newly generated virtual-physical mapping. There are two primary schemes employed for selecting an entry to replace. First, a random scheme is used to spread allocation uniformly by randomly selecting the potential entries in the TLB. Some systems use a scheme for spreading data across a set of blocks in a pseudo-randomized manner to get reproducible behavior, which is particularly useful during hardware debugging. Secondly, a least-recently-used ("LRU") scheme can be used to reduce the chance of throwing out information that will be needed soon. The entry replaced is the one that has been unused for the longest time. As such, this scheme makes use of a corollary of the principle of temporal locality: if recently used blocks are likely to be used again, then the best candidate for disposal is the least recently used.

A virtue of the random scheme is that it is simple to build in hardware. As the number of blocks to keep track of increases, LRU becomes increasingly expensive and is frequently only approximated.

As will be described, the present invention discloses a method and apparatus for a TLB with a built-in replacement scheme without complicated decoding logic.

SUMMARY OF THE INVENTION

Therefore, it is an object of the present invention to implement a replacement scheme for the entries in the translation lookaside buffer of a cache memory.

It is also an object of the present invention to implement a pseudo-LRU replacement scheme for the entries in the translation lookaside buffer.

It is another object of the present invention to implement the pseudo-replacement scheme without incurring complicated decode and encode logic for the translation lookaside buffer.

A method and apparatus for selecting an entry to be replaced in a translation lookaside buffer in a computer system is disclosed. The translation lookaside buffer stores a plurality of entries of virtual-to-physical address translations with each entry having a used bit and a valid bit. The circuit comprises a validity circuit coupled to the valid bit of each entry for determining whether the entry is valid and if not, the validity circuit causes a first signal to be asserted; a use circuit coupled to the used bit of each entry and to the validity circuit for determining whether the entry is used when a control signal is present and if not, the use circuit assets a second signal to the validity circuit, the asserted second signal causing the first signal to be asserted; a ripple circuit coupled to each entry, its previous entry and its next entry, the ripple circuit receiving the first signal from the validity circuit of each entry and a first FOUND signal from its previous entry, the ripple circuit outputting a second FOUND signal, the ripple circuit causing the second FOUND signal to be asserted when the first signal is asserted and the first FOUND signal is de-asserted, the ripple circuit causing the second FOUND signal to be asserted when the first FOUND signal is asserted, the second FOUND signal being input to the ripple circuit of its next entry, wherein an asserted second FOUND signal for an entry causes the second FOUND signal for its next entry to be asserted, such that an entry with an asserted second FOUND signal propagates the asserted second FOUND signal through its next consecutive entries.

BRIEF DESCRIPTION OF THE DRAWINGS

Further objects, features and advantages of the present invention will become apparent in the following detailed description in which.

NOTATION AND NOMENCLATURE

Figure 1:
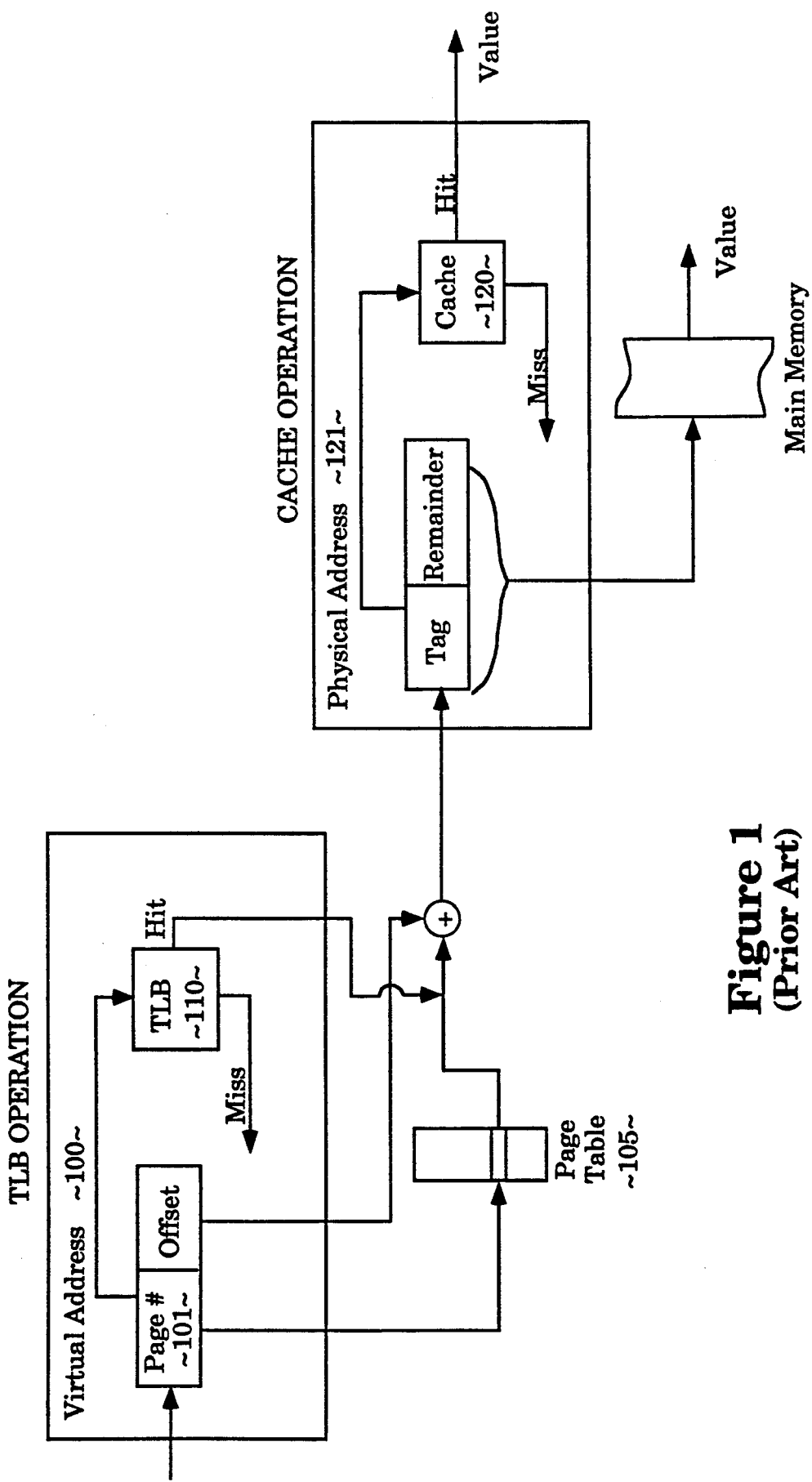
FIG. 1 is a simplified block diagram illustrating the operations of TLB and cache memory.

The detailed descriptions which follow are presented largely in terms of algorithms and symbolic representations of operations within a computer system. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

It should be noted that a signal named xxx-bar is a logical inversion of the signal xxx. For example, FOUND-bar is a logical inversion of the signal FOUND.

Coding Details

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in an assembly language which provides a machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention.

DETAILED DESCRIPTION OF THE INVENTION

A method and apparatus for a TLB replacement circuit is disclosed. In the following description for purposes of explanation, specific memories, organizations, and architectures, etc. are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily.

Figure 2:
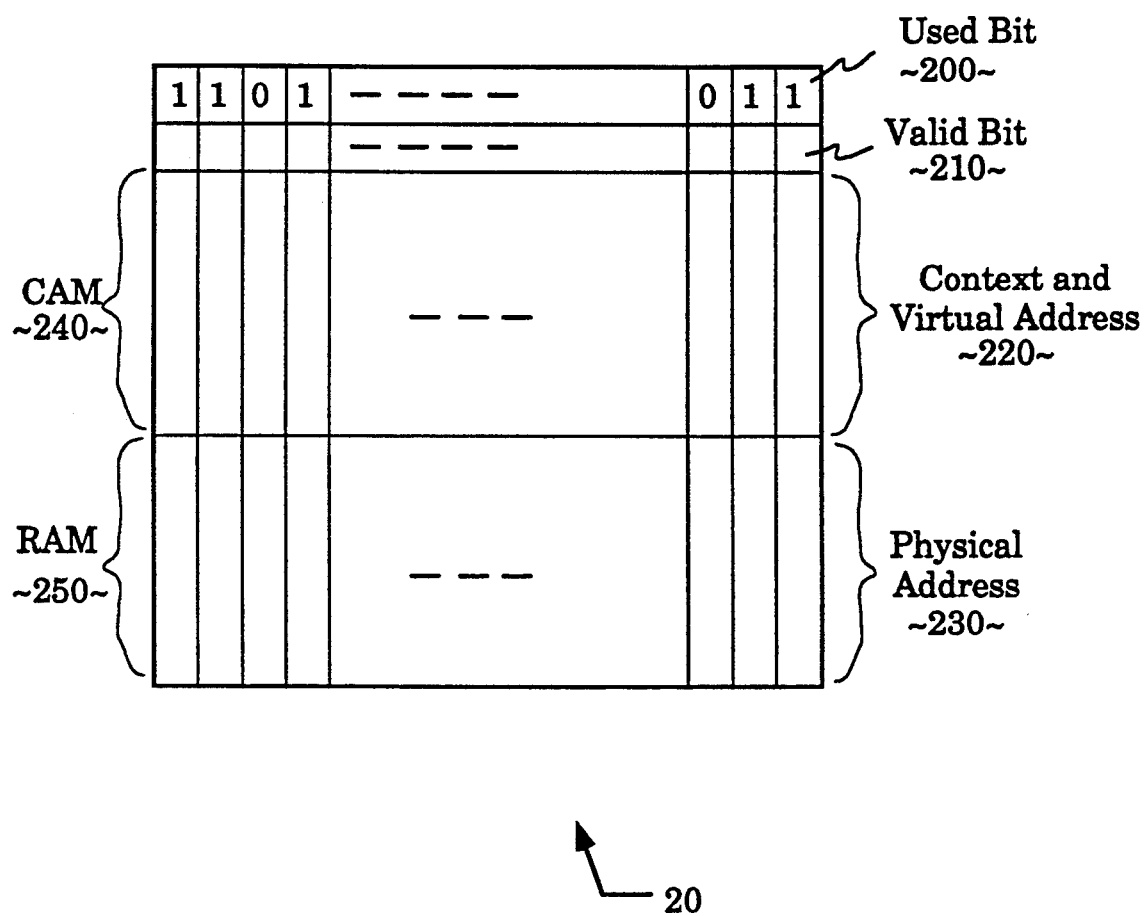
FIG. 2 illustrates a typical TLB array.

Reference is now made to FIG. 2, where a typical TLB array 20 is illustrated. Each entry within the TLB array 20 typically comprises used bit 200, valid bit 210, context and virtual address 220 and physical address 230. The used bit 200 is reset as an entry in the TLB 20 is created by storing mapping from the virtual address 220 and the physical address 230 for subsequent access. When the entry in the TLB array 20 is used for its virtual-to-physical mapping, the used bit 200 is set. The valid bit 210 is reset when the translation from the virtual address 220 to the physical address 230 is no longer valid. The context and virtual address 220 is typically implemented in content-addressable memory ("CAM") 240, whereas the physical address 230 is implemented in the random-access memory ("RAM"). An entry in the TLB array 20 is replaced when a new entry representing a new virtual-to-physical address translation is generated as a result of the TLB miss. Replacing an entry in the TLB array 20 according to an LRU scheme requires finding an entry that is least recently used. Since the used bit 200 is set after an entry has been accessed by a virtual address to obtain its physical address translation, an LRU replacement mechanism will be required to search out the entries in the TLB array 20 with the used bit 200 reset. Furthermore, since a reset valid bit 210 represents the fact that the virtual-physical translation is not valid, it should be appreciated by those skilled in the art that an entry with a valid bit 210 reset should also be replaced before a least-recently used entry (with a used bit 200 reset).

Figure 3:
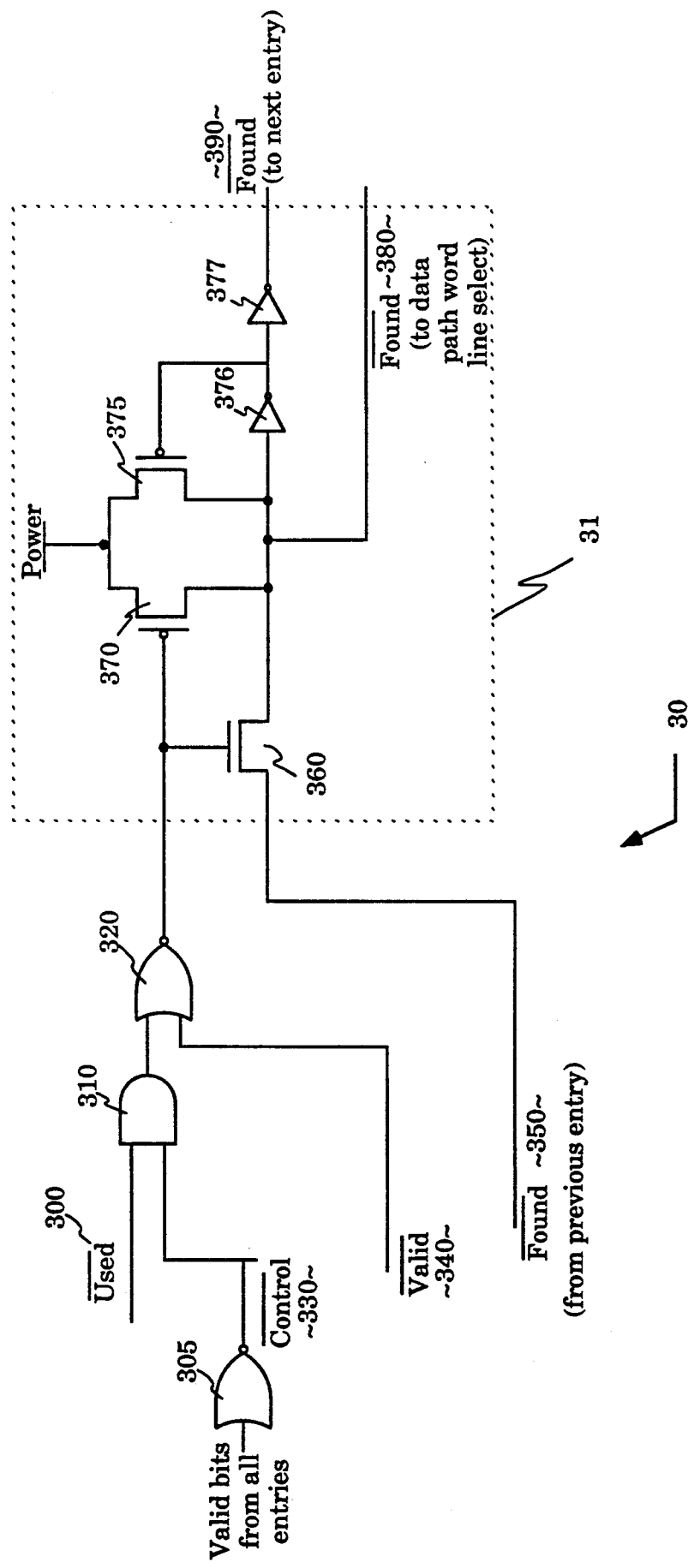
FIG. 3 is a schematic diagram of a carry-propagate circuit for an entry in the TLB incorporating the teaching of the present invention.

Reference is now made to FIG. 3, where a schematic diagram of a carry-propagate circuit 30 implementing the TLB replacement scheme is illustrated. For each entry in the TLB array, the carry-propagate circuit 30 comprises an AND gate 310 with used-bar 300 and control-bar 330 as inputs, a NOR gate 320 with the output of AND gate 310 and valid-bar 340 as inputs, and a ripple circuit 31. The ripple circuit 31 connects the output from the NOR gate 320 to the connected gates of p-channel MOSFET 370 and n-channel MOSFET 360. A signal FOUND-bar 350 from the previous entry in the TLB array is connected to the drain of n-channel MOSFET 360. Another p-channel MOSFET 375 has its source connected to the source of p-channel MOSFET 370 and to the power supply, while its drain is connected to the drain of p-channel MOSFET 370 and to the source of n-channel MOSFET 360. The gate of p-channel MOSFET 375 is connected between buffers/inverters 376 and 377. A signal FOUND-bar 390 is extracted from the drain connections of p-channel MOSFETS 370 and 375 to be input to the next entry's replacement circuit. Another signal, FOUND-bar 380, is extracted from the output of buffer/inverter 377 to be applied to the data path word line select to select the least recently used entry in the TLB array. A signal control-bar 330 at one of the inputs of the AND gate 310 is used to disable the consideration of the used bit for replacing a TLB entry. When control-bar 330 is turned low by the presence of some invalid entries, the circuit will not replace a valid but old entry since there are some invalid ones. Control-bar 330 can easily be generated by NOR-ing all of the valid bits in the TLB, such as through the use of NOR gate 305.

The operation of the carry-propagate circuit 30 for each entry in the TLB array is essentially to detect an entry with a reset valid bit, or a reset used bit if the valid bit is set as the entries are checked serially. If an entry is both used and valid, a first signal ("not found") is carried and propagated to the next entry and beyond. When an entry is detected with either a reset valid bit or a reset used bit, a second signal ("found"), instead of the first signal, is carried and propagated to the rest of the entries in the TLB array. As such, the entry to replace is the first one in the series of entries with a propagated second signal.

As shown in FIG. 3, the output of the NOR gate 320 is turned high when an entry is both valid and used, i.e. valid-bar signal 340 is low and used-bar signal 300 is low. The high state at the output of the NOR gate 320 thus allows a high FOUND-bar signal 350 from the previous entry to be passed through n-channel MOSFET 360 to FOUND-bar signal 390, which is propagated to the following entries, as long as they are valid and used, i.e. output of the NOR gate 320 connected to each entry is high.

As shown in FIG. 3, an invalid entry, i.e. valid-bar 340 equals 1, will cause the output of the NOR gate 320 to be zero, which turns on p-channel MOSFET 370 and brings the FOUND-bar signal 390 (to the next entry) low, as well as the FOUND-bar signal 380 (to data path word line select) low, while turning off the n-channel MOSFET 360. Once a FOUND signal from the previous entry is asserted, the carry-propagate circuit 30 will no longer carry for the rest of the entries. As a result, the entry with the valid bit reset can be selected to be replaced. Similarly, with respect to the used bit, assuming valid-bar 340 is 0 with respect to the input to the NOR gate 320, a reset used bit will cause the AND gate 310 to go high, which will cause the NOR gate 320 to output low. Essentially, used bits can only be entered into consideration when all valid bits are set, i.e., all entries are valid. As a result, the used bits associated with the entries after the current entry would cause the next circuit not to carry-propagate so that the entry with the used bit reset can also be selected by the low state of the FOUND-bar signal 380 of the ripple circuit 31.

As can be seen from the carry-propagate circuit 30, the TLB array with the carry-propagate circuit will not require any decode or encode logic circuit to perform the search and replacement scheme. Furthermore, with the carry-propagate circuit 30, both the valid bit and the used bit associated with an entry of the TLB array can be used to select the appropriate entry for replacement.

We claim:

1. In a computer system using virtual addressing for its memory operations, a circuit for selecting an entry in a translation lookaside buffer to be replaced, wherein said translation lookaside buffer stores a plurality of entries of virtual-to-physical address translations, each of said plurality of entries has a used bit and a valid bit, said used bit for indicating when an entry is accessed for said memory operations, said valid bit for indicating when the virtual-to-physical translation of an entry is not valid, said circuit comprising:

a plurality of validity means, each of said plurality of validity means coupled to the valid bit of each entry for determining whether said entry is valid and if not, said validity means causing a first signal to be asserted;

a plurality of use means, each of said plurality of use means coupled to the used bit of each entry and to said validity means for determining whether said entry is used when a control signal is present and if not, said use means asserting a second signal to said validity means, said asserted second signal causing said first signal to be asserted;

a plurality of ripple means, each of said plurality of ripple means coupled to each entry, to an immediately previous entry and to a next consecutive entry, said ripple means receiving said first signal from the validity means of each entry and a first FOUND signal from said immediately previous entry, said ripple means outputting a second FOUND signal, said ripple means causing said second FOUND signal to be asserted when said first signal is asserted and said first FOUND signal is de-asserted, said ripple means causing said second FOUND signal to be asserted when said first FOUND signal is asserted, said second FOUND signal being input to the ripple means of said next consecutive entry, wherein an asserted second FOUND signal for an entry causes the second FOUND signal for said next consecutive entry to be asserted, such that an entry with an asserted second FOUND signal propagates said asserted second FOUND signal through next consecutive entries.

2. A circuit according to claim 1, further comprising a plurality of select means, each of said plurality of select means coupled to said ripple means of each entry for selecting an entry in said translation lookaside buffer from among a plurality of consecutive entries, said entry being the first in said plurality of consecutive entries, each of said plurality of consecutive entries having its second FOUND signal asserted.

3. A circuit according to claim 2, wherein said use means coupled to the used bit of each entry is an AND gate, and said validity means coupled to the valid bit of each entry is a NOR gate.

4. A circuit according to claim 3, wherein said ripple means coupled to each entry comprises:
  a n-channel MOSFET having its gate coupled to the output of said NOR gate and its drain coupled to said first FOUND signal from said immediately previous entry;
  a first p-channel MOSFET having its gate coupled to the gate of said n-channel MOSFET and having its drain coupled to a source of said n-channel MOSFET, said drain of said first p-channel MOSFET and said source of said n-channel MOSFET generating a third FOUND signal to be outputted to said select means;
  a second p-channel MOSFET having its drain coupled to said source of said n-channel MOSFET and to said drain of said first p-channel MOSFET and having its gate coupled to said drain of said first p-channel MOSFET through a first inverter;
  a second inverter, an input side of said second inverter coupled to the gate of said second p-channel MOSFET, said second inverter outputting said second FOUND signal to be outputted to said next consecutive entry.

5. A circuit according to claim 1, further comprising a plurality of control means, each of said plurality of control means coupled to said use means of each entry for disabling said use means when at least one of said plurality of entries is invalid.

6. A circuit according to claim 5, wherein said control means of each entry disables said use means of each entry by NOR-ing all of the valid bits of said plurality of entries.

7. In a computer system using virtual addressing for its memory operations, a method of selecting an entry in a translation lookaside buffer to be replaced using a circuit, wherein said translation lookaside buffer stores a plurality of entries of virtual-to-physical address translations, each of said plurality of entries has a used bit and a valid bit, said used bit for indicating when an entry is accessed for said memory operations, said valid bit for indicating when the virtual-to-physical translation of an entry is not valid, and wherein said circuit comprises a plurality of validity means, a plurality of use means and a plurality of ripple means wherein each of said plurality of validity means is coupled to said valid bit of each entry, each of said plurality of use means is coupled to said used bit of each entry, and each of said ripple means is coupled to each entry, said method comprising the steps of:
  determining whether said entry is valid by said validity means coupled to the valid bit of each entry, and if not, said validity means causing a first signal to be asserted;
  determining whether said entry is used when a control signal is present by said use means coupled to the used bit of each entry and to said validity means and if not, said use means asserting a second signal to said validity means, said asserted second signal causing said first signal to be asserted;
  receiving said first signal from the validity means of each entry and a first FOUND signal from an immediately previous entry by said ripple means coupled to each entry, to said immediately previous entry and to a next consecutive entry, said ripple means outputting a second FOUND signal, said ripple means causing said second FOUND signal to be asserted when said first signal is asserted and said first FOUND signal is de-asserted, said ripple means causing said second FOUND signal to be asserted when said first FOUND signal is asserted, said second FOUND signal being input to the ripples means of said next consecutive entry, wherein an asserted second FOUND signal for an entry causes the second FOUND signal for said next consecutive entry to be asserted, such that an entry with an asserted second FOUND signal propagates said asserted second FOUND signal through next consecutive entries.

8. A method according to claim 7, wherein said circuit further comprises a plurality of select means, each of said plurality of select means coupled to said ripple means of each entry, further comprising the step of selecting an entry in said translation lookaside buffer from among a plurality of consecutive entries by said select means coupled to said ripple means of each entry, said entry being the first in said plurality of consecutive entries, each of said plurality of consecutive entries having its second FOUND signal asserted.

9. A method according to claim 8, wherein said use means coupled to the used bit of each entry is an AND gate, and said validity means coupled to the valid bit of each entry is a NOR gate.

10. A method according to claim 9, wherein said ripple means coupled to each entry comprises:
  a n-channel MOSFET having its gate coupled to the output of said NOR gate and its drain coupled to said first FOUND signal from said immediately previous entry;
  a first p-channel MOSFET having its gate coupled to the gate of said n-channel MOSFET and having its drain coupled to a source of said n-channel MOSFET, said drain of said first p-channel MOSFET and said source of said n-channel MOSFET generating a third FOUND signal to be outputted to said select means;
  a second p-channel MOSFET having its drain coupled to said source of said n-channel MOSFET and to said drain of said first p-channel MOSFET and having its gate coupled to said drain of said first p-channel MOSFET through a first inverter;
  a second inverter, an input side of said second inverter coupled to the gate of said second p-channel MOSFET, said second inverter outputting said second FOUND signal to be outputted to said next consecutive entry.

11. A method according to claim 7, wherein said circuit further comprises a plurality of control means, each of said plurality of control means coupled to said use means of each entry, further comprising the step of disabling said use means of each entry by said control means of each entry when at least one of said plurality of entries is invalid.

12. A method according to claim 11, wherein said control means of each entry disables said use means of each entry by NOR-ing all of the valid bits of said plurality of entries.

* * * * *